Sept. 8, 1970          J. R. WYLDE          3,527,629
METHOD OF PRODUCING FASTENER MEMBER HAVING UPSTANDING
FASTENER ELEMENTS SHAPED FOR RELEASABLE ENGAGEMENT
WITH COOPERATING FASTENER ELEMENTS
Filed Nov. 15, 1966
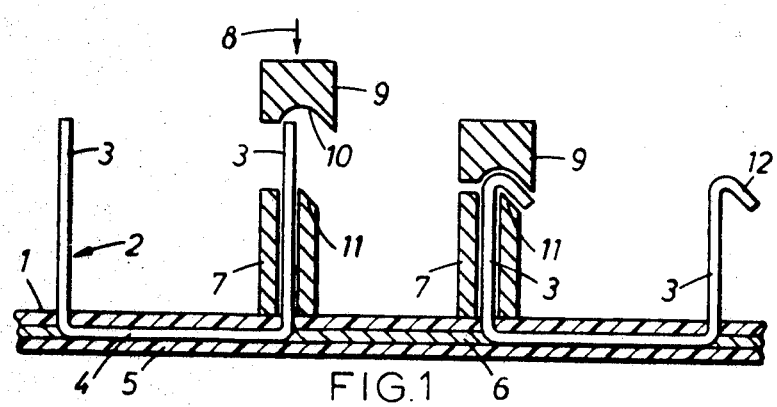
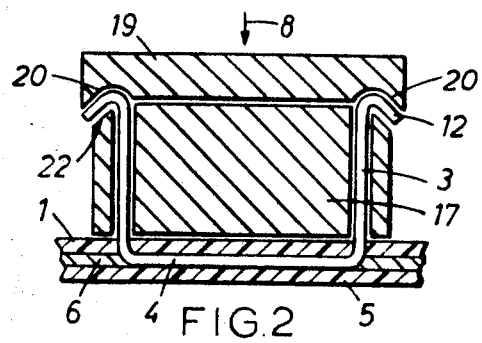
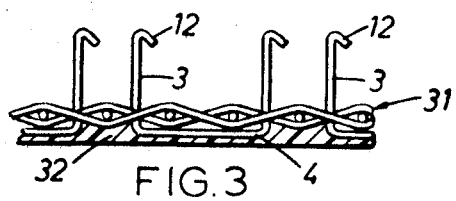
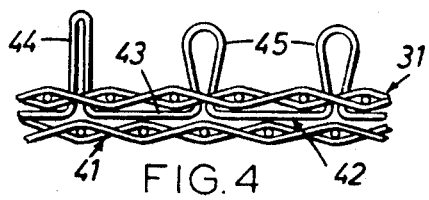
INVENTOR
Joseph Rowland Wylde
BY
Johnson and Kline
ATTORNEYS

United States Patent Office 3,527,629
Patented Sept. 8, 1970

3,527,629
METHOD OF PRODUCING FASTENER MEMBER HAVING UPSTANDING FASTENER ELEMENTS SHAPED FOR RELEASABLE ENGAGEMENT WITH COOPERATING FASTENER ELEMENTS
Joseph Rowland Wylde, Stoke-on-Trent, England, assignor to Velcro S.A., Nyon, Switzerland, a Swiss body corporate
Filed Nov. 15, 1966, Ser. No. 594,421
Claims priority, application Great Britain, Nov. 18, 1965, 49,047/65
Int. Cl. A44b 19/00; D05c 15/00
U.S. Cl. 156—72         7 Claims

ABSTRACT OF THE DISCLOSURE

Fastener members have filamentary elements, such as metal wires which have anchoring portions engaged against the underside of a foundation comprising a strip or sheet, such as of woven wire, fabric or a solid material, and fastener portions forced through said foundation and upstanding from the opposite side of the latter, a backing layer which may be formed of a fabric or a layer of plastic material formed in situ is applied to the underside of the foundation, the fastener portions after being forced through the foundation in generally straight form are subsequently deformed to fastener shape.

---

The invention relates to a fastener member of the type having upstanding elements on a surface shaped to releasably engage with like or cooperating elements on a surface of another fastener member.

The present invention has as its major object the provision of an improved form of such a fastener member and in particular, one suited for use at high temperatures, together with convenient production methods.

The invention accordingly provides a method of producing a fastener member comprising the steps of forming filamentary means with fastener and securement portions at least approximately at right angles and pushing the fastener portions through sheet material so that the fastener portions are upstanding from one surface of the sheet material and the securement portions are in engagement with the other surface of the sheet material. The fastener portions can be performed as hooks, loops or headed stems or initially generally straight; in the latter case they are subsequently deformed. The invention also provides a fastener member comprising filamentary means having fastener and securement portions at least approximately at right angles, the fastener portion extending through sheet material to upstand from one surface thereof with the securement portion against the other surface, the fastener portion being shaped for releasable engagement with like or cooperating fastener portions of another fastener member. Preferably a backing sheet or layer is secured to the other surface of the sheet material.

The filamentary means can initially comprise short lengths of wire, suitably of hardened spring metal, bent at right angles to provide the securement portion and one or preferably two fastener portions, the elements being then generally L-shaped or U-shaped respectively. The base can be a piece of woven fabric of suitable thickness, in the shape of a strip, for example.

Alternatively, a single length of wire is bent so as to have doubled fastener portions extending at right angles to the main length of the wire at equally spaced points along it. The fastener portions can form loops by bowing the two sides apart. If the fastener element comprises filamentary means of steel and sheet material of woven glass fibre, it can be safely employed at very high temperatures.

The invention will be more readily understood and carried into effect by reference to the following illustrative description and to the accompanying drawings, in which:

FIG. 1 is a sectional side view illustrating phases in the production of a first fastener member in accordance with the invention;

FIG. 2 is a like view illustrating a phase of an alternative production method; and FIGS. 3 and 4 are like views of other fastener members embodying and produced in accordance with the invention.

Referring to FIG. 1, the fastener member illustrated therein comprises a strip of plastics sheet material 1 and a large number of filamentary fastener means each in the form of generally U-shaped staple 2 of metallic wire. In a phase of manufacture previous to that illustrated, the limbs 3 of the staples 2 have been pushed through the strip 1 to project generally at right angles from one side thereof, the base 4 of the U-shaped staple being brought into engagement with the other side of the strip. A further strip 5 of plastics material was then secured to the strip 1 by means of an adhesive 6 with the bases 4 between the strips.

The next phase of manufacture effects deformation of the straight upstanding limbs 3, as shown on the left of FIG. 1, so that these are capable of releasable engagement with like or cooperating elements on another fastener member. Accordingly, the limbs 3 are received in a slot in an anvil 7 which is moved in a direction parallel to the surface of the strip 1 to the position on either side of the limb shown in respect of the second limb 3 from the left of FIG. 1. The strip 5 of course rests on a suitable support (not shown). It will be appreciated that the limbs 3 are not in practice treated individually and that the anvil will accommodate a plurality of them, for example, a row of the limbs aligned across the strip. The free end of the limb 3 projects above the anvil and is acted on by a downward movement, in the direction of the arrow 8, of a former 9 provided with a generally cup shaped recess 10. The recess is shaped to bend the end of the limb downwardly onto a tapered side 11 of the anvil as shown in respect of the second limb from right of FIG. 1. Finally, the former 9 is raised and the anvil 7 withdrawn leaving the limb 3 with a generally hooked free end 12, as shown at the right of FIG. 1, which is capable of engagement with a like hooked element or with loop-shaped element.

FIG. 2 illustrates an alternative form of tool for producing hook-like fastener elements. The basic element is the same as shown in FIG. 1 and like parts have the same reference numerals. An anvil 17 is however employed which provides a pair of slots for reeciving an adjacent pair of the limbs 3. A former 19 with deforming recesses 20 cooperates with sloping sides 22 of the anvil to produce, in a single operation hook-shaped ends 12 on both the limbs or rows of limbs 3. The ends 12 face in opposed directions but are no less effective with a suitable cooperating fastener member. The invention can of course employ any suitable deforming tool to obtain the fastener portion shapes required.

The fastener member of FIG. 3 resembles that of FIGS. 1 and 2 in having generally U-shaped filamentary fastener elements which are accordingly given the same reference numerals as have been used before. The limbs 3 however project through sheet material 31 which is a woven fabric. The base 4 of each U-shaped element is moreover secured by a layer 32 of plastics material in which it is embedded. The layer 32 at least partially impregnates the fabric layer, in as far as the porosity of the fabric permits.

The production of this form of fastener member resembles that previously described. The backing layer 32 is of course applied by spreading the plastics material over the appropriate surface of the fabric layer 31 in an uncured, liquid state and allowing it to harden. The plastics material can be selected to have a desired degree of flexibility when cured if this is required. The backing layer can be applied before or after the deformation of the limbs 3 to provide the hooked ends 12 which can be carried out as described above or in ny other suitable way.

The fastener member of FIG. 4 resembles that of FIG. 3 in having an upper layer 31 which is woven but has a woven backing layer 41 also. The two layers 31 and 41 are secured together, as by stitching or adhesive. The filamentary means 42 initially comprises a length of wire formed into a plurality of aligned base or securement portions 43 with connecting doubled lengths 44 for forming fastener portions extending away from them at right angles as shown at the left of FIG. 4. It is in this form that the means 42 is urged against the fabric layer 31 so that the lengths 44 penetrates through it. Subsequently, the lengths 44 are deformed into loops 45 as shown on the right of FIG. 4 by pressure applied at right angles to the plane of the fabric layers. Any suitable tool, on the lines of the tools described with reference to FIGS. 1 and 2 can be employed to effect this deformation; alternatively, the lengths 44 can be formed into hooks.

It will be evident that the fastener members described and the methods of producing them can be widely varied within the scope of the invention which is not limited to the particular forms of filamentary means, sheet materials, and backing layers described. Where the nature of the sheet material allows, for example, where this is a relatively loosely woven fabric, the fastener portions can be preformed, that is, pushed through in their final shapes. Formation of the fastener portions need not be mechanical; upstanding stems of thermoplastics material can be formed in ball shaped or other enlargements by the action of heat alone.

Fastener portions of different shape can be combined on a single fastener member, and two members can be provided with interengaging fastener elements in a pattern such that elements of one kind can engage elements of another kind on the other fastener, and vice versa. Fastener members according to the invention can be used together for other fastener members, for example, fabric as claimed in British Pat. 721,338 or uncut pile fabric treated by the machine claimed in British Pat. 935,228.

What is claimed is:

1. A method of producing a fastener member having upstanding from a base of sheet material a plurality of fastener elements shaped for releasable engagement with cooperating fastener elements upstanding from a base of a cooperating fastener member, the method comprising the steps of forming a plurality of filamentary means, each filamentary means having at least one fastener portion and at least one securement portion, the fastener and securement portions being at least approximately at right angles to one another, pushing the fastener portions through a piece of sheet material so that the fastener portions are upstanding from one surface of the sheet material and the securement portions are in engagement with the opposite surface of the sheet material, and deforming the fastener portions upstanding from the said one surface so that said fastener portions each have at least one stem upstanding from the said one surface and a part extending transversely from the stem and spaced from the said one surface for releasable engagement with said cooperating fastener elements.

2. A method as claimed in claim 1 having the step of applying a backing layer over the opposite surface of the sheet material.

3. A method as claimed in claim 1 having the step of forming a plastics backing layer in situ over the opposite surface of the sheet material.

4. A method as claimed in claim 1 in which the filamentary means are formed of metallic wire, the fastener portions each consists of a single stem, and the deforming causes the fastener elements to be hook-shaped.

5. A method as claimed in claim 1 in which each filamentary means is formed as a plurality of generally U-shaped members, the two limbs of said U-shaped member constituting said fastener portions and the base thereof constituting said securement portion.

6. A method as claimed in claim 1 in which the filamentary means are formed of metallic wire and the fastener portions consist of doubled lengths of the wire joined at the free end of said fastener portions, and the subsequent step comprises deforming the doubled lengths into loop-shaped fastener elements.

7. A method as claimed in claim 6 in which each filamentary means is formed with a plurality of aligned securement portions, and each adjacent pair thereof being joined by an integral one of said doubled lengths.

References Cited

UNITED STATES PATENTS

| | | | |
|---|---|---|---|
| 2,552,114 | 5/1951 | Reinhard | 156—92 X |
| 2,671,494 | 3/1954 | Coulliette. | |
| 2,717,437 | 9/1955 | De Mestral | 161—65 |
| 2,977,266 | 3/1961 | Sedgley | 161—62 X |
| 3,083,737 | 4/1963 | De Mestral | 139—46 |
| 3,130,111 | 4/1964 | Izumi | 24—204 X |
| 3,147,528 | 9/1964 | Erb | 24—204 |
| 3,277,547 | 10/1966 | Billarant | 24—204 X |
| 3,279,090 | 10/1966 | Harper | 156—91 X |
| 3,365,757 | 1/1968 | Billarant | 24—204 |
| 3,417,440 | 12/1968 | Billarant | 156—72 X |

JOHN T. GOOLKASIAN, Primary Examiner

J. C. GIL, Assistant Examiner

U.S. Cl. X.R.

24—204; 140—81; 156—92; 161—48, 65, 69; 245—5